No. 1,933
JOSEPH RECKENDORFER ASSIGNEE OF JOSEPH ROSENTHAL
DESIGN FOR TRADE MARKS FOR
LEAD PENCILS
Reissued April 11. 1865
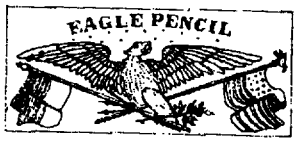
Witnesses
S. S. Fahnestock
O Hass
Joseph Reckendorfer. Assee
by his Attys
Baldwin & Son

UNITED STATES PATENT OFFICE.

JOSEPH RECKENDORFER, OF NEW YORK, N. Y., ASSIGNEE OF JOSEPH ROSENTHAL, OF SAME PLACE.

DESIGN FOR A TRADE-MARK FOR LEAD-PENCILS.

Specification forming part of Design No. 1,229, dated April 3, 1860; Reissue No. 1,933, dated April 11, 1865.

*To all whom it may concern:*

Be it known that JOSEPH ROSENTHAL, of the city, county, and State of New York, did invent or produce a new and original Design for a Trade-Mark Label for Lead-Pencils, of which the following is a full, clear, and exact description.

The said new design consists of an eagle in flight, and the words "Eagle Pencil" arranged in an arch over the eagle. The wings of the eagle are extended, and its head turned toward its left wing. It grasps three arrows in one foot and an olive branch in the other, and two flags wave beneath the wings, the staffs of which cross between its legs.

The design is described more particularly in the accompanying drawing, and by the following details.

The mouth of the eagle is open and the tongue prominent. The back of the neck exhibits two projections or curled feathers. Each wing is fully exhibited and both are nearly alike in size and position. The tail extends below the other portions of the eagle, and inclines to the observer's right. The right foot of the eagle extends beyond the line of the body and grasps the three arrows, which diverge considerably from each other. The staff of the flag of Bavaria terminates near the tip of the right wing of the eagle, and the staff of the flag of the United States a little beyond the tip of its left. The left foot of the eagle grasps an olive branch.

Having thus particularly described the new design, what is claimed as the invention of the said ROSENTHAL is—

The design for a new trade-mark label for lead-pencils, composed of the eagle in flight, combined with the words "Eagle Pencil," substantially as and for the purpose described.

In testimony whereof I have hereunto subscribed my name.

JOS. RECKENDORFER.

Witnesses:

WM. D. BALDWIN,

JOHN A. TAUBERSCHMIDT.